United States Patent [19]

Okura et al.

[11] Patent Number: 4,464,040
[45] Date of Patent: Aug. 7, 1984

[54] CAMERA WITH DIAPHRAGM ADJUSTMENT CONTROL

[75] Inventors: Zenichi Okura, Ichikawa; Shinsuke Kohmoto, Tokyo, both of Japan

[73] Assignee: Asahi Kogaku Kogyo Kabushiki Kaisha, Tokyo, Japan

[21] Appl. No.: 448,714

[22] Filed: Dec. 10, 1982

[30] Foreign Application Priority Data

Dec. 17, 1981 [JP] Japan .......................... 56-188507[U]

[51] Int. Cl.³ .............................................. G03B 7/08
[52] U.S. Cl. ................................................... 354/455
[58] Field of Search .................... 354/36, 38, 40, 42, 354/43, 44, 29, 46, 448, 271.1, 455

[56] References Cited

U.S. PATENT DOCUMENTS

| | | | |
|---|---|---|---|
| 4,009,866 | 3/1977 | Iwata et al. | 354/44 |
| 4,079,386 | 3/1978 | Murakami et al. | 354/38 |
| 4,079,387 | 3/1978 | Kawamura et al. | 354/38 |
| 4,396,272 | 8/1983 | Shono et al. | 354/46 |

*Primary Examiner*—Russell E. Adams
*Attorney, Agent, or Firm*—Christie, Parker & Hale

[57] ABSTRACT

A photographic camera has a camera body and an interchangeable lens assembly engagable with the camera body. A diaphragm having an adjustable diaphragm value in the lens assembly is adjusted upon shutter release. The diaphragm value is sensed in the lens assembly during adjustment and a first signal representative of the sensed diaphragm value is transmitted to the camera body. In the camera body the sensed diaphragm value is compared with a desired diaphragm value responsive to the first signal. Responsive to the comparison, adjustment of the diaphragm value is arrested to establish the desired diaphragm value. To sense the diaphragm value, a light transmission path is established between a light source and a light receiver. The light transmission path includes a first optical grating mounted on a movable diaphragm actuating member and a second optical grating mounted on a stationary member. The gratings each have alternating sections of the same width with different optical characteristics so adapted to intermittently transmit a light pulse to the receiver for each increment of movement of the movable member equal to the width of the sections. The light pulses are counted to produce an indication of the diaphragm value.

18 Claims, 10 Drawing Figures

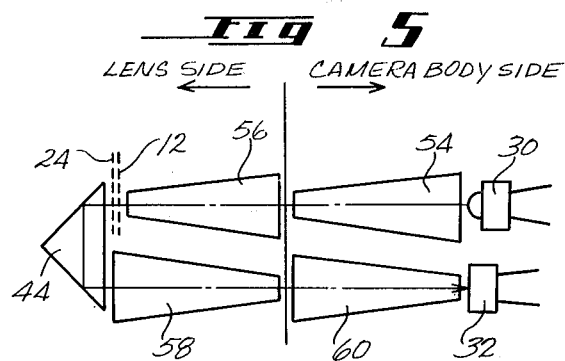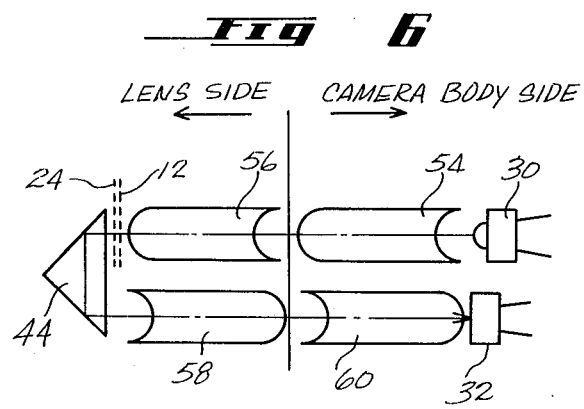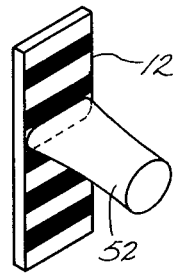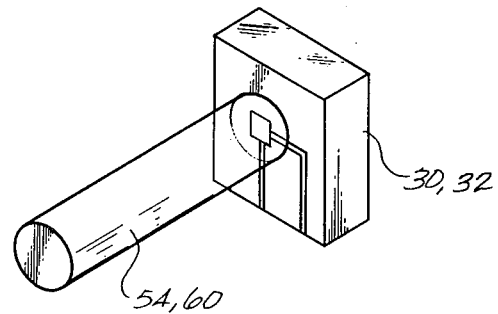

CAMERA WITH DIAPHRAGM ADJUSTMENT CONTROL

BACKGROUND OF THE INVENTION

The present invention relates to a diaphragm value signal generator for photographic cameras of automatic diaphragm control type.

As a leading trend in light measuring techniques for modern photographic cameras, there has commonly been adopted a so-called full aperture metering technique by which the light coming from an object to be photographed through the objective with fully opened aperture is received within the camera interior to perform light measuring, because of various advantages such as a bright visual field and easy focusing. In this full aperture metering technique, conventionally luminance of the light transmitted through the objective with fully opened aperture, preset shutter speed, sensitivity of the film being used, and, if desired by the photographer, a selectively preset exposure multiple are subjected to arithmetic processing to determine an appropriate calculated diaphragm value and, after shutter release, the diaphragm is mechanically moved, i.e., stopped down, until said calculated diaphragm value is attained. With this technique, furthermore, it has been required that the actual diaphragm valve is continuously monitored in the course of stopping down of the diaphragm and the diaphragm movement is arrested and fixed at the moment when the actual diaphragm value coincides with the calculated diaphragm value.

For such monitoring of the diaphragm movement, there has usually been provided a pulse generator adapted to emit electric pulses in response to movement of a member within the camera body and representative of the diaphragm's stopping down movement so that the number of pulses emitted by the pulse generator depends on the amount of stop down of the diaphragm. These pulses are counted by a counter and the accumulated count value represents the actual diaphragm value. Details of such a mechanism are well known from, for example, application Ser. No. 258,044, filed Apr. 28, 1981, the disclosure of which is incorporated fully herein by reference. However, this is a technique in which the actual diaphragm value is indirectly determined by monitoring the amount of movement of the diaphragm driving member, so that a certain amount of error is inevitably included in the detected diaphragm value signal due to various causes such as play inherent in the mechanical linkages connected between the diaphragm driving member and the diaphragm blades, and the time delay caused by load torque in transmission of diaphragm value. Such error varies, particularly in photographic cameras using many interchangeable lenses, and differs for variously mechanical transmission linkages. In consequence, the camera often causes false exposure.

SUMMARY OF THE INVENTION

To overcome these problems, the present invention provides on a diaphragm actuating member or the like a pulse generating member adapted to convert an amount of movement of the actuating member or the like which directly takes part in driving of diaphragm blades into the number of pulses on the time base.

In one aspect of the invention, a photographic camera has a camera body and an interchangeable lens assembly engagable with the camera body. A diaphragm having an adjustable diaphragm value in the lens assembly is adjusted upon shutter release. The diaphragm value is sensed in the lens assembly during adjustment and a first signal representative of the sensed diaphragm value is transmitted to the camera body. In the camera body the sensed diaphragm value is compared with a desired diaphragm value responsive to the first signal. Responsive to the comparison, adjustment of the diaphragm value is arrested to establish the desired diaphragm value.

In another aspect of the invention, a photographic camera has a diaphragm with an adjustable diaphragm value, a movable member, the movement of which represents the diaphragm value, and a stationary member adjacent to the movable member. A light transmission path lies between a light source and a light receiver. The light transmission path includes a first optical grating mounted on the movable member and a second optical grating mounted on the stationary member. The gratings each have alternating sections, preferably of the same width, with different optical characteristics so adapted to intermittently transmit a light pulse to the receiver for each increment of movement of the movable member equal to the width of the sections. The light pulses are counted to produce an indication of the diaphragm value.

BRIEF DESCRIPTION OF THE DRAWINGS

The features of specific embodiments of the best mode contemplated of carrying out the invention are illustrated in the drawings, in which:

FIG. 4 is a schematic view of the manner in which an end of an optical fiber is flattened so as to guide light to a pulser employed in practicing the invention;

FIG. 5 is a schematic diagram of an arrangement of optical fibers for coupling light to and from a pulser of the type employed to practice the invention;

FIG. 6 is a schematic view of an alternative embodiment of the arrangement of FIG. 5;

FIG. 7 is a perspective view showing the manner in which the light emitting element or light receiving element is formed integrally with an optical fiber;

DETAILED DESCRIPTION OF THE SPECIFIC EMBODIMENTS

Figure 1:
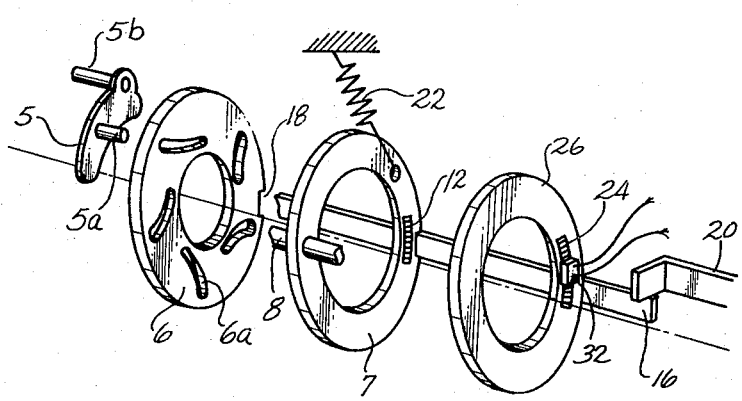
FIG. 1 is an exploded perspective view of part of a camera illustrating principles of the invention.
Figure 2:
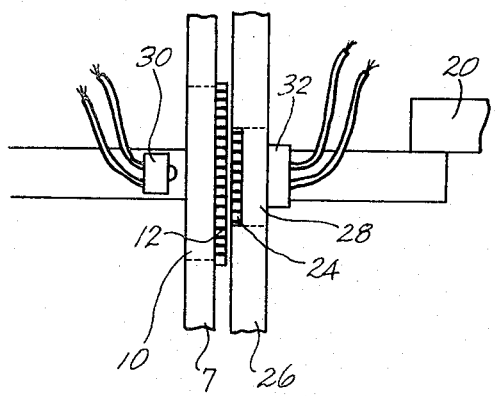
FIG. 2 is a side schematic view of some of the components of FIG. 1.

FIG. 1 is a developed assembly diagram showing the mutual relationship of respective members constituting a diaphragm mechanism in a lens barrel of an interchangeable lens assembly and a pulse generator according to the present invention. FIG. 2 is a sectional view showing the part of the diaphragm mechanism shown in FIG. 1 that is related to the pulse generator being used. Reference numeral 5 designates diaphragm blades each having a pin 5a attached to one side thereof. Each of pins 5a is inserted into an associated one of cam grooves 6a formed in a rotatable actuating disc 6 serving to actuate these diaphragm blades 5. Each diaphragm blade 5 has another pin 5b attached to the opposite side. Pin 5b engages an associated one of a plurality of openings formed in a support ring (not shown) which is fixedly connected to an outer casing for the objective. Thus, pin 5b forms a pivot point around which blade 5 rotates. It should be understood here that, although only a single diaphragm blade 5 is shown, there are obviously a plurality of such diaphragm blades 5 each having a pair of pins attached to both sides, respectively, so as to be inserted or engaged into the corresponding cam groove or opening. Reference is made to application Ser. No. 229,879, filed Jan. 30, 1981, for a more detailed disclosure of the diaphragm. The disclosure of this application is incorporated fully herein by reference.

A cam lever 7 is mounted on a shaft 8 extending through an opening formed near the periphery of said cam lever 7 so as to be rotatable within the lens barrel about shaft 8. The cam lever 7 is provided with an opening 10 for transmission of a light beam, preferably at a location as far as possible from the shaft 8. A pulser 12 at the side of the cam lever 7 covers the opening 10. However, opening 10 is not required if the cam lever 7 itself is made of light transmissible material. The pulser 12 is a so-called optical grating, which comprises, elementary sections of two types being different in their optical characteristic and alternately arranged at regular or partially variable pitches. Typically, the one elementary section has an optical characteristic allowing 100% transmission of light therethrough while the other section has an optical characteristic allowing no light transmission. Such typical case will be assumed in the following description. Accordingly, the one section will be referred to as a "transmitting section" while the other section will be referred to as a "blocking section."

A release plate 16 is attached to cam lever 7 at the opposite side from the shaft 8. The release plate 16 engages at one end a notch 18 formed in an edge of the diaphragm actuating disc 6. The other end of release plate 16 is normally held by a swing lever 20 extending from the interior of the camera body which the lens assembly engages. A spring 22 is suspended between the cam lever 7 and the lens barrel so that the cam lever 7 and the release plate 16 fixed thereto are normally biased under a compressive force of the spring 22 to move the diaphragm blades 5 in the direction of stopping down thereof. Such force biasing the diaphragm blades to be stopped down is restrained by the swing lever 20, except upon shutter release. Upon shutter release, the swing lever 20 is set free so that the release plate 16 is caused to move together with the swing lever 20 responsive to the compressive force of the spring 22 upwards as seen in FIG. 1. In consequence, the actuating disc 6 is rotated so as to move the diaphragm blades 5 in the direction of stopping down thereof.

Although the cam lever 7 is shown as a hollow annular disc, the hollow portion of this annular disc is to pass therethrough the light coming from an object to be photographed. Therefore, it should be understood that the configuration of the cam lever 7 is not limited to that as shown so long as the light of the object to be photographed is not prevented from being transmitted therethrough. However, it is preferred, in view of the restricted space within the lens barrel, that the cam lever 7 is configured as an annular disc as shown or a disc partially cut away, so that the cam lever 7 can move to a relatively large extent.

Facing the cam lever 7 on the side where the pulser 12 is carried, there is arranged a support disc 26 carrying on the side facing the pulser 12 another pulser 24 which is similar to the pulser 12. Said support disc 26 is provided to carry the pulser 24 spaced from the pulser 12 by a distance approximately less than ½ pitch to avoid undesirable diffraction, and is fixed to the lens barrel. The support disc 26 may be a member large enough to carry the pulser 24. In the vicinity of the pulser 24, the support disc 26 is provided with an opening 28 which is similar to the opening 10, for transmission of the light beam.

A light emitting element 30 is opposed to a light receiving element 32 with interposition of the pulser 12 of the cam lever 7 and the pulser 24 of the support disc 26 therebetween. A light emitting diode providing or adapted to provide a fine parallel light beam is preferable as the light emitting element 30. The light receiving element 32 preferably has an effective surface sufficiently large for reliable reception of the light coming from the light emitting element 30.

The pulsers 12 and 24 are so constructed that the light coming through the transmitting sections of the pulser 12 is blocked by the blocking sections of the pulser 24 when the cam lever 7 is at certain positions, but can pass through the transmissible sections of the pulser 24 when the cam lever 7 is at other positions. More specifically, it is preferable that each blocking section of the pulser 24 has a width equal to that of each transmitting section in the pulser 12 and each transmitting section of the pulser 24 has a width equal to that of each blocking section in the pulser 12. However, it is not always necessary to construct pulsers 12, 24 in conformity with the above-mentioned preferred relationship so long as a difference in level between two signals of different levels generated at the output of the light receiving element 32 as the pulser 12 is moved can be discriminated by a posterior arithmetic circuit. With such construction, resolution of the amount of movement of the cam lever 7 depends only upon the interval between each pair of adjacent transmitting sections or blocking sections, namely, the pitch of the pulsers 12, 24 but not upon the beam width of light incident upon the pulser 12. As a result, two requirements, which would be contradictory for a single pulser arrangement, i.e., generation of sufficient signal level difference at the output of the light receiving element 32 and detection of fine movement of the cam lever 7, can be simultaneously met. However, the support disc 26 and the pulser 24 may be saved when the beam width of light coming from the light emitting element 30 is smaller than the pulser pitch the desired resolution demands.

In the specific embodiment of FIGS. 1 and 2, both the light emitting element 30 and the light receiving element 32 are incorporated within the lens barrel. Energization of the light emitting element 30 as well as transmission of the output signal from the light receiving element 32 is achieved via electric contacts provided on the lens mount and the camera body mount exclusively for such purpose, as disclosed in application Ser. No. 237,987, filed Feb. 25, 1981, the disclosure of which is incorporated fully herein by reference.

The embodiment of FIGS. 1 and 2 functions fundamentally as follows. Prior to shutter release, the swing lever 20 is locked with the release plate 16 so positioned that the state corresponding to the fully opened aperture value is established. In this state, it is not important whether the light emitting element 30 is energized or not, but it is preferred from the viewpoint of energy saving that the light emitting element 30 is not energized in the state prior to shutter release. Upon shutter release, the swing lever 20 is unlocked and the light emitting element 30 is energized, if necessary. Upon unlocking of the swing lever, the release plate 16 and the cam lever 7 are driven under the compressive force of the spring 22 and thereby the diaphragm actuating disc 6 is rotated to move the diaphragm blades 5 in the direction of stopping down thereof. The light receiving element 32 produces pulse signals, one for every pitch of the pulsers 12, 24, as the cam lever 7 and, therefore, the pulser 12, is moved relative to the light emitting element 30, the pulser 24, and the light receiving element 32. More specifically, the light receiving element 32 produces an output signal of a certain level when the transmitting sections of the pulser 12 are aligned with the transmitting sections of the pulser 24 and an output signal of the other level when the transmitting sections of the pulser 12 are aligned with the blocking sections of the pulser 24 so that signals of different levels are alternately produced on a time base as a function of position of disc 6 and thus the diaphragm value. These pulses, which are representative of the actual diaphragm value, are applied to a counter circuit provided in the camera body and counted thereby. The number of pulses thus produced exactly corresponds at a ratio of 1:1 to the movement of the cam lever 7 with a precision corresponding to the pitch of the pulsers 12, 24. In consequence, the actual diaphragm value can be exactly determined in the form of a digital value by the arithmetic circuit in the camera body.

Although both the light emitting element 30 and the light receiving element 32 are preferably incorporated in the lens barrel according to the embodiment of FIGS. 1 and 2, another embodiment in which the light emitting element 30 and the light receiving element 32 are incorporated in the camera body is also possible within the scope of the present invention. Such embodiment will be described with reference to FIGS. 3 and 4.

Figure 3:
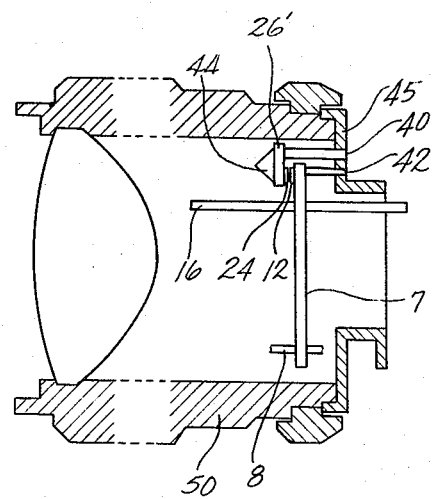
FIG. 3 is a side-sectional view of a lens assembly illustrating an alternative embodiment of the invention.

FIG. 3 shows an arrangement in which the electrical contacts as described in the previously mentioned application Ser. No. 237,987, are replaced by optical fibers, each of 1 to 2 mm or approximately 3 mm in diameter, depending on the case, so that the optical information rather than the electrical information is transmitted between the camera body mount and the lens assembly mount. In FIG. 3, only the pulse generating mechanism for practicing the invention is shown. Reference numerals 40, 42 designate optical fibers having their ends at the camera body side slightly retracted with respect to the end surface of a mount 45 to avoid damage of these ends. Reference numeral 26' designates a support disc, which is similar to the previously mentioned support disc 26, fixed to a housing 50 of the lens barrel to support the pulser 24. One side of the support disc 26' bears against the end surface of the optical fiber 40. A prism 44 is connected to the other side of support disc 26'. The other optical fiber 42 is located in conjugate relationship with the optical fiber 40 so that the light beam coming from the optical fiber 40 is deflected by the prism 44 by an angle of 180° and impinges upon the optical fiber 42. Prism 44 serves as a double reflective mirror. In the optical path defined by the optical fiber 40, the prism 44 and the optical fiber 42, there are arranged the pulser 24 adhesively mounted on the support disc 26', and the pulser 12 on the cam lever 7, respectively.

Based on optical reversibility, the light coming from the light emitting element in the camera body may be incident on one of the optical fibers 40, 42 and the light receiving element in the camera body may be coupled to the optical fiber at the light exit side. The light transmitted to the light receiving element is modulated by the pulsers 12, 24 in accordance with movement of cam lever 7.

The manner in which the light is guided by the optical fibers 40, 42 to the pulsers 12, 24, will be explained. As shown in FIG. 4, an optical fiber 52 at the light incident side (preferably it is the optical fiber 42 of FIG. 3) is flattened at an end adjacent the pulser so that the width of this optical fiber substantially corresponds to the width of each transmitting section or blocking section of the pulsers 12, 24. This will eliminate provision of the pulser 24. Specifically, the precision for detection of the movement of the cam lever 7 can be maintained high even when said pulser 24 is eliminated. The optical fiber 52 preferably comprises a bundle of many fine optical fiber elements each approximately 0.1 mm in diameter for easily flattening of its end.

FIGS. 5 and 6 illustrate a modification of the embodiment shown in FIG. 3, by which it is intended to improve the efficiency of optical couplings between the optical fiber of the camera body side and the optical fiber of the lens side, and between the optical fibers provided on both sides of the pulser.

FIG. 5 shows an arrangement in which each optical fiber is generally shaped as a cone to improve the optical coupling efficiency at the end surfaces of the optical fibers. With such arrangement the light entrance end surface of each optical fiber is larger than the light exit end surface. Thus, the tapered or conical optical fibers are provided, so that the light rays are reliably coupled even when the lateral positions of the respective optical fibers are somewhat out of alignment with one another. Accordingly, it is possible to establish a relatively large tolerance with which the respective optical fibers 54, 56, 58, 60 are positioned in the assembly. It is also possible to allow a relatively large tolerance with which the optical fibers are positioned on the lens mount and the camera body mount, so that a relative position error, which possibly occurs when an interchangeable lens is mounted or dismounted, would not affect the desired optical coupling efficiency. It should be noted here that the light exit side of the optical fiber 56 may be configurated like the optical fiber 52 as shown in FIG. 4 rather than the conical configuration.

FIG. 6 illustrates an arrangement in which the light entrance side of each optical fiber is formed as a concave lens while the light exit side is formed as a convex lens. The entrance end surface forming the concave lens permits light rays to enter at an incident angle wider than in the case of the flat end surface, while the light exit end surface forming the convex lens results in an exit angle narrower than in the case of the flat end surface. In consequence, the optical coupling efficiency between the optical fibers is substantially improved as compared to the case of the flat end surface.

The light rays from the light emitting element inevitably have a certain light emitting angle and it is preferred, for reduction of optical coupling loss between the light emitting element and the optical fiber in the embodiments of FIGS. 3, 5, and 6, that the optical fiber 54 and the light emitting element 30 are coupled to each other in the optimum manner in advance, as shown in FIG. 7. It is also preferred to construct the light receiving element 32 and the optical fiber 60 as a single piece unit.

Figure 8:
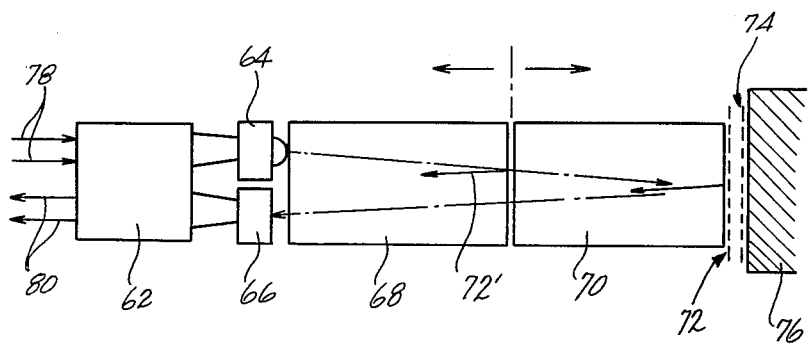
FIG. 8 is a schematic diagram of another embodiment of an arrangement for coupling light to and from a pulser employed in practicing the invention.

FIG. 8 illustrates a further embodiment in which a single optical fiber rod is utilized for both directions. Reference numeral 62 designates a photo-interrupter comprising a light emitting element 64 and a light receiving element 66 both of which are oriented in the same direction. An optical fiber 68 on the camera body side and an optical fiber 70 on the lens side are not required to have a truly circular cross section, but, instead, they may have elliptic, oval, or oblong cross section. However, it is preferred that the optical fibers 68 and 70 have identical cross sections. The light emitting element 64 and the light receiving element 66 are located along the longitudinal axis with respect to a flat cross-section thereof so that the light rays coming from the light emitting element 64 are reflected by a pulser, which will be described later in detail, and said reflected light rays impinge upon the light receiving element 66. Between the light emitting element 64 and the light receiving element 66, there is preferably provided a shield plate (not shown) to shield the reflected light at the first end surface of the optical fiber 68 and the other stray light.

The optical fibers 68 and 70 have their end surfaces located slightly retracted from the respective surfaces of the camera body mount and the lens mount so that their end surfaces are protected against damage. This arrangement, however, would cause undesirable reflection on the end surfaces of the optical fibers 68 and 70 (reflection on the end surface of the optical fiber 68 is designated by reference numeral 72') but this can be avoided by providing these end surfaces with anti-reflection coating.

Behind the optical fiber 70, there are provided pulsers 72, 74 similar to the previously mentioned pulsers 12, 24. The pulser 72 comprises an optical grating consisting of sections adapted to transmit and sections adapted to block light rays coming from the optical fiber 70. The pulser 74 comprises an optical grating fixedly mounted on a support 76 and consisting of light absorption sections and reflection sections. In this embodiment, either the pulser 72 may be moved relative to the optical fiber 70 and the pulser 74, or the pulser 74 and therefore, the support 76, may be moved relative to the optical fiber 70 and the pulser 72. In the former case, the pulser 72 is operatively associated with the diaphragm and in the latter case, the pulser 74 and support 76 are operatively associated with the diaphragm.

The space between the pulser 72 and the pulser 74 is preferably less than a half pitch of the gratings and, from such a point of view, it is preferred that the pulser 74 is operatively associated with the diaphragm, i.e., the pulser 74 is fixedly mounted, for example, on the cam lever 7. In such a case, it is preferred that the pulser 72 is formed on the end surface of the optical fiber 70 as by means of vapor deposition simultaneously with, or before or after the anti-reflection coating. Both manufacturing and assembly are thereby substantially simplified.

The embodiment of FIG. 8 functions in a manner substantially similar to the manner in which the previous embodiments function. DC voltage applied to input lines 78 actuates the light emitting element 64 to emit light rays which will be incident upon substantially the center of the rear end surface of the optical fiber 70. These incident light rays produce the reflected rays, the amount of which varies between two levels according to the relative position of the pulser 72 and the pulser 74. More specifically, relative movement of the pulsers 72, 74 generates light pulses whose intensity levels alternately vary between two values. Upon receipt of the light pulses, the light receiving element 66 generates the corresponding electric pulses on an output line 80. The number of such electric pulses depends on the amount of movement of the pulser 72 or the pulser 74, and, accordingly, on the amount of movement of the cam lever 7, which represents the actual diaphragm value.

Figure 9:
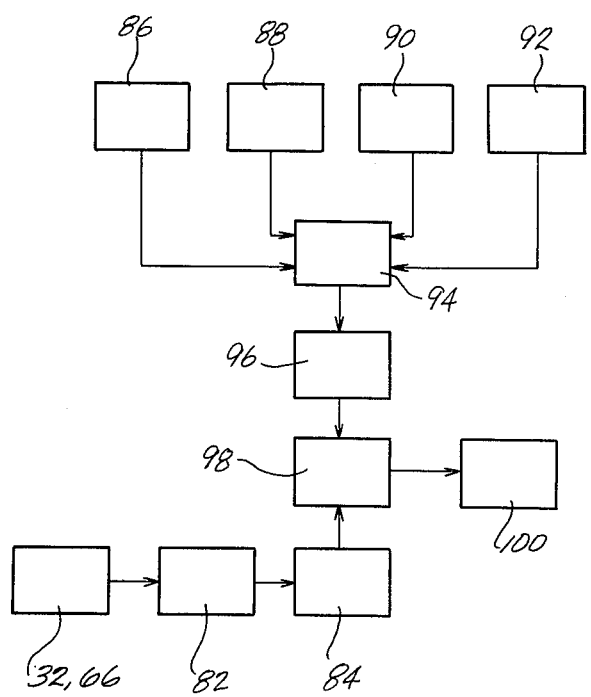
FIG. 9 is a schematic block diagram of an automatic diaphragm control system of a camera.

FIG. 9 is a block diagram illustrating an example of the diaphragm control circuit arranged in the camera body. The pulse signals from the light receiving elements 32, 66 are shaped by a waveform shaping circuit 82 and then applied to a counter 84. A proper diaphragm value is determined by a proper diaphragm value determining circuit 96 as a result of calculation by an arithmetic circuit 94 based on various factors such as object luminance information 86, shutter speed information 88, film sensitivity information 90 and exposure multiple information 92. The proper diaphragm value signal provided by the proper diaphragm value determining circuit 96 is compared by a comparator 98 with the actual diaphragm value provided by the counter 84. When a coincidence is established, the comparator 98 outputs a signal with which a control magnet 100 is actuated to arrest the diaphragm movement and thereby to fix a diaphragm value. Reference is made to application Ser. No. 229,879 for a further description of the diaphragm control circuit.

Figure 10:
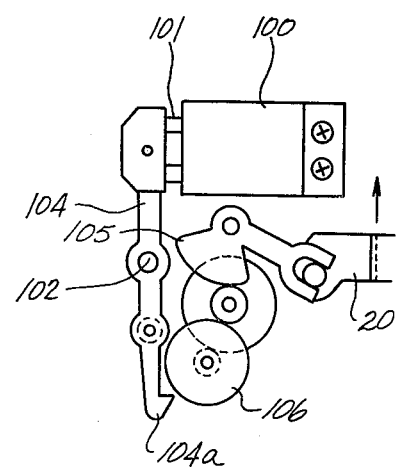
FIG. 10 is a schematic diagram of an exemplary mechanism to arrest a diaphragm at a desired diaphragm value.

FIG. 10 shows an example of the mechanism in the camera body by which the control magnet 100 arrests the movement of the diaphragm and holds the diaphragm value at the value attained as a result of the arresting operation of the control magnet. Details of this mechanism are disclosed in application Ser. No. 258,044. The swing lever 20 follows the release lever 16 driven under compression of the spring 22 after shutter release and thus is moved upwards as seen in FIG. 10. This movement is converted by a segment gear 105 having a lever into a rotation of a gear 106. When the control magnet 100 is actuated (de-energized, in this embodiment) upon application of the signal from the comparator 98, an armature 101 is repelled from control magnet 100, a locking lever 104 is rotated counterclockwise about a pivot 102, then a locking click 104a engages a tooth of the gear 106 to prevent it from being further rotated. As a result, the swing lever 20 is locked and thereby the movement of the diaphragm blades in the direction of stopping down is arrested so that a desired diaphragm value is established.

The embodiments described hereinabove have explained the case in which the amount of movement of the cam lever is detected by the pulser mounted on the cam lever as an indication of the actual diaphragm value. However, it is obviously possible that the pulser may be directly fixed to the diaphragm actuating disc.

According to the present invention, as will be apparent from the foregoing description, the actual diaphragm value can be detected with high precision by detecting the amount of movement of a member located in the lens of the diaphragm actuating disc or a member operatively associated therewith based on the principle of a light chopper, so that the diaphragm control precision can be improved simply by utilizing the diaphragm value thus detected. Furthermore, with an arrangement in which a pair of pulsers are put one upon another and one of these pulsers is operatively associated with the diaphragm, the precision for detecting the amount of movement depends on the pitch of the pulsers, so that the diaphragm value detection can be achieved with an extremely high precision by employing pulsers of fine pitch construction, for example, those constructed by the photolithographic technique.

In the case where the optical fibers are employed as the media for transmission of the light from the light emitting element, a single pulser will suffice when the light exit end of the optical fiber is flattened in conformity with the pulser's pitch.

Finally, the rotation angle of the diaphragm actuating disc or the amount of movement of the release plate is preferably linear with respect to the diaphragm value and this requirement is satisfied only when the diaphragm actuating disc has grooves of specific configuration. According to the present invention, however, the actual diaphragm value is represented by the number of light pulses generated from a single pulser or a pair of pulsers so that it is unnecessary to form the cam grooves in any specific shape and it suffices only to modify the pulser's pitch partially. Such modification is easily achieved by the photolithographic technique. Similarly, the problem of so-called preliminary displacement as disclosed in applications Ser. No. 235,839 and Ser. No. 235,840, filed Feb. 19, 1981, is also solved, according to the present invention, simply by partially or wholly modifying the pulser's pitch for every interchangeable lens. The diaphragm value can thus be easily obtained with high precision in accordance with the present invention.

The disclosure of Appendix A hereto is incorporated herein by reference.

What is claimed is:

1. A photographic camera comprising:
   a camera body;
   an interchangeable lens assembly engagable with the camera body;
   a diaphragm having an adjustable diaphragm value in the lens assembly;
   means for adjusting the diaphragm value upon shutter release;
   means in the lens assembly for sensing the diaphragm value during adjustment;
   means for transmitting to the camera body a first signal representative of the sensed diaphragm value;
   means in the camera body responsive to the first signal for comparing the sensed diaphragm value with a desired diaphragm value; and
   means responsive to the comparing means for arresting the adjusting means to establish the desired diaphragm value.

2. The camera of claim 1, in which the sensing means comprises a movable member, the movement of which represents the diaphragm value, and means for generating as the first signal an electrical signal representative of the movement of the movable member, and the transmitting means comprises an electrical circuit from the lens assembly to the camera body.

3. The camera of claim 1, in which the sensing means comprises a movable member, the movement of which represents the diaphragm value, and means for generating as the first signal an optical signal representative of movement of the movable member, and the transmitting means comprises a light source and a light receiver in the camera body and optical fiber means connected from the light source to the generating means and from the generating means to the light receiver such that modulated light is transmitted from the source to the receiver.

4. The camera of claim 2, in which the diaphragm comprises a rotatable actuating disc and diaphragm blades mounted on the actuating disc to change the diaphragm value as the actuating disc rotates, and the movable member comprises a rotatable cam lever attached to the actuating disc to rotate therewith.

5. The camera of claim 4, in which the adjusting means comprises a spring for biasing the cam lever in a direction to reduce the diaphragm value, a release plate in the lens assembly connected to the cam lever, and a swing lever extending from the camera body to the lens assembly, the swing lever restraining the release plate prior to shutter release, the swing lever being set free upon shutter release to permit the cam lever to rotate responsive to the spring.

6. The camera of claim 1, in which the sensing means comprises a movable member, the movement of which represents the diaphragm value, a light source, a light receiver, and a light transmission path between the light source and receiver including a first optical grating mounted on the movable member and a second optical grating mounted on a stationary part of the lens assembly, the gratings each having alternating sections with different optical characteristics so adapted to intermittently transmit a light pulse to the receiver for each increment of movement of the movable member equal to the width of the sections and means for counting the light pulses to produce an indication of the diaphragm value.

7. The camera of claim 6, in which the light source and receiver are in the camera body and the light transmission path additionally comprises a first optical fiber connecting the light source to the interface of the camera body and the lens assembly, a second optical fiber coupling the interface to the gratings, a third optical fiber coupling the gratings to the interface and a fourth optical fiber coupling the interface to the receiver, the first and fourth optical fibers being in the camera body and the second and third optical fibers being in the lens assembly.

8. The camera of claim 7, in which the light transmission path additionally comprises a double reflecting mirror for coupling the gratings to the third optical fiber.

9. The camera of claim 8, in which the first, second, third, and fourth optical fibers are conical, the entrance end of each optical fiber being larger than the exit end thereof.

10. The camera of claim 8, in which the optical fibers are cylindrical, the entrance end of each optical fiber being concave and the exit end thereof being convex.

11. The camera of claim 6, in which the light source and receiver are in the camera body and light transmission path additionally comprises a first bundle of optical fibers coupling the light source and receiver to the interface of the camera body and the lens assembly and a second optical fiber bundle coupling the interface to the gratings, the first grating being closer to the second optical fiber bundle than the second grating, the first grating having alternating sections that transmit and block light and the second grating having alternating sections that reflect and absorb light.

12. A photographic camera comprising:
   a diaphragm having an adjustable diaphragm value;

a movable member, the movement of which represents the diaphragm value;

a stationary member adjacent to the movable member;

a light source and light receiver;

a light transmission path between the light source and receiver including a first optical grating mounted on the movable member, and a second optical grating mounted on the stationary member, the gratings each having alternating sections with different optical characteristics so adapted to intermittently transmit a light pulse to the receiver for each increment of movement of the movable member equal to the width of the sections; and means for counting the light pulses to produce an indication of the diaphragm value.

13. The camera of claim 12, in which the first grating has alternating sections that transmit and block light and the second grating has alternating sections that transmit and block light.

14. The camera of claim 13, in which the light source and receiver are on opposite sides of the gratings.

15. The camera of claim 13, in which the light source and receiver are on the same side of the gratings and the light transmission path additionally includes a double reflecting mirror on the other side of the gratings to return light passing through the gratings.

16. The camera of claim 12, in which the light source and light receiver are on the same side of the gratings and the first grating is between the light source and receiver and the second grating, the alternating sections of the first grating transmitting and blocking light and the alternating sections of the second grating reflecting and absorbing light.

17. The camera of claim 16, in which the light transmission path additionally comprises optical fiber means between the light source and receiver and the gratings.

18. The camera of claim 12, in which the alternating sections of both gratings have the same width.

* * * * *